S. MATSUMOTO.
METALLIC LINK BELT.
APPLICATION FILED AUG. 14, 1920.
1,427,008. Patented Aug. 22, 1922.
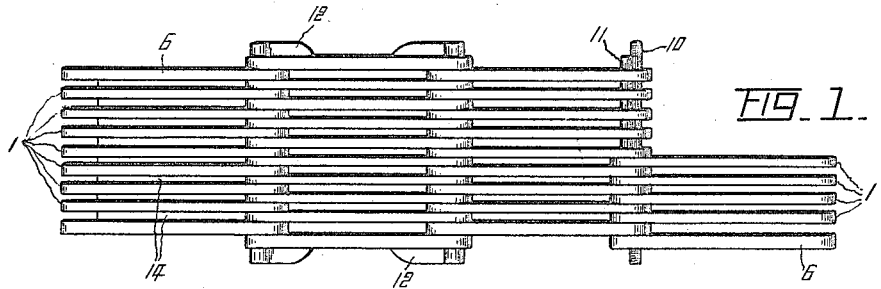
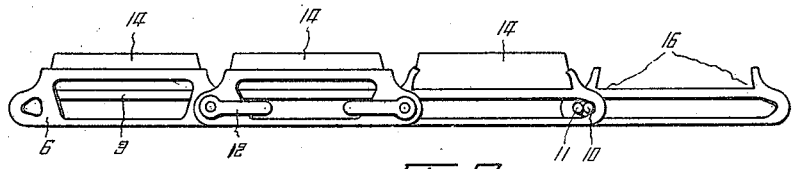
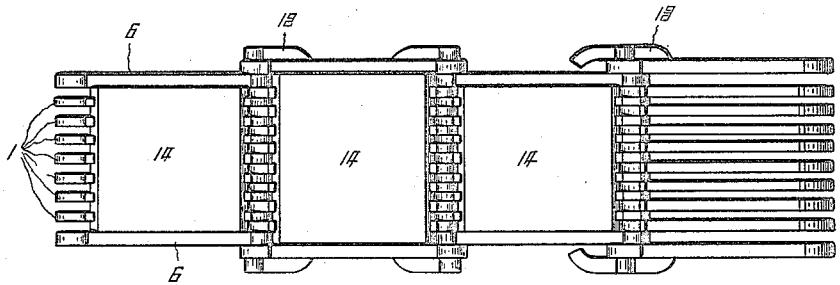
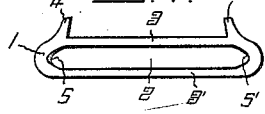 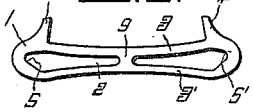  
 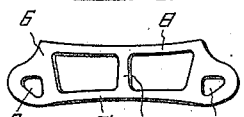 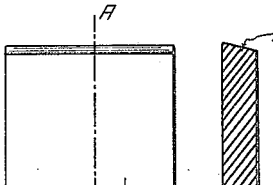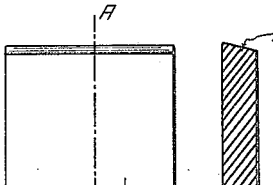
Inventor
S. Matsumoto,
By H. R. Kerelake.
Attorney

UNITED STATES PATENT OFFICE.

SHIGERU MATSUMOTO, OF OSAKA, JAPAN.

METALLIC LINK BELT.

1,427,008.	Specification of Letters Patent.	Patented Aug. 22, 1922.

Application filed August 14, 1920. Serial No. 403,561.

*To all whom it may concern:*

Be it known that I, SHIGERU MATSUMOTO, of No. 67 Minami-Hamamachi, Kita-ku, Osaka, Japan, have invented certain new and useful Improvements in Metallic Link Belts, of which the following is a specification.

This invention has for its object to provide a metallic link belt structure equipped with a series of pulley engaging traction blocks designed to prevent the belt from slipping from the surfaces of pulleys over which the belt is arranged.

A further object is the provision of a belt of this character in which the traction blocks are capable of swift and convenient removal in the event that repair or replacement of the block is necessary.

A still further object resides in the provision of a belt in which each of the links is composed of a series of members connected together with the members of the adjacent link in such manner that the width of the belt may be varied as desired by the omission or addition of the link members, it being understood that the width of the traction blocks varies according to the width of the belt so as to adapt the belt to pulleys of varying widths.

With these and other objects in view, the invention consists of certain novel features of construction, combination and arrangement of parts as will be hereinafter more fully described and claimed.

In the accompanying drawings:

Figure 1 is a fragmentary plan view of the outer face of the improved belt, or that face which is not adapted for contact with the pulley;

Fig. 2 is an edge elevation of a portion of the belt, certain of the parts being removed;

Fig. 3 is a plan view of the inner or working face of the belt;

Figs. 4 and 5 are side elevations of the intermediate and outer link members composing each link of the belt;

Figs. 6 and 7 are views similar to Figs. 4 and 5 illustrating modifications of the link members;

Fig. 8 represents side elevations of the relatively long and short pivot rods connecting the adjacent ends of link members of contiguous links;

Fig. 9 is a perspective view of one form of nut for application to the end of one of the hinge rods for maintaining the link members in assembled relation;

Fig. 10 is a perspective view of a modified type of nut;

Fig. 11 is a plan view of one of the traction blocks, and, Fig. 12 is a transverse sectional view of the block taken on the line A—A of Fig. 11.

Referring to the drawings in detail, wherein similar reference numerals designate corresponding parts throughout, the several views, each link of the chain is composed of a plurality of uniformly spaced intermediate link members 1, the number of which may be varied according to the width of belt it is desired to employ. Each intermediate link member 1 is of elongated flat form and provided with a longitudinal slot 2 having curved extremities 5 and 5' forming seats for the hinge or pivot rods to be hereinafter more fully described. One edge of each intermediate link member 1 is provided with lateral projections or gripping fingers 4 and 4' the inner faces of which are disposed in outwardly converging relation thereto to engage and prevent displacement of a traction block 14 the side edges 15 of which are beveled according to the angular position of the projections 4 and 4' whereby to prevent lateral displacement of the block from the link.

Subsequent to the assembly of the required number of link members 1 and the insertion of the traction block 14, the outer link members 6 having terminal openings 7 and 7' are arranged so that the block retaining portions 8 thereof lie in abutment with the side faces of the block 14 and thereby prevent longitudinal displacement of said block from the link. To reduce the weight and cost of the links 6, the metal portions of the letter are preferably cut or stamped out as indicated at 8' and the portions of the link members 1 which lie between the block engaging projections 4 and 4' and the block engaging portions 8 of the outer link members 6 may be either straight, as suggested in Fig. 4, or concave as suggested in Figs. 6 and 7.

The adjacent ends of groups of spaced intermediate links 1 and side links 6 are interfitted in the usual manner so that the slots 2 of the intermediate links and the openings 7 and 7' of the outside links 6 of the adjacent groups of link members are disposed in alinement. A relatively long pivot rod 10 is subsequently inserted between the adjacent sets of link members and a spacing rod 11 of less length than the rod 10 is arranged in position alongside the rod 10 as indicated in Figs. 1 and 2. The portions of the longer rod 10 lying outwardly of the terminals of the rod 11 are screwthreaded for receiving a type of nut such as illustrated in Fig. 9, and indicated at 12. The nuts 12 are advanced toward the threaded terminals of the rods 10 until they abut and are arrested by engagement with the terminals of the rods 11 and thus the links composing the belt are pivotally connected together and afforded a requisite amount of free pivotal movement as to insure a desirable degree of flexibility of the entire belt structure. The nut 12 is provided with an extended terminal formed of malleable material permitting it to be readily bent so as to enter the cut out portion 8' of the adjacent outer link member 6 whereby to prevent radial movement of the nut and its subsequent displacement and loss.

From the foregoing it is evident that the improved belt possesses a high degree of flexibility substantially equivalent to that of the usual and expensive leather power transmitting belts and that the blocks 14 which are so arranged as to engage the working faces of the pulleys in order to provide requisite traction insuring against slipping of the belt when applied to use.

It is further evident that by varying the number of the intermediate link members 1, the width of the belt may be widely varied according to the size and type of the pulley to which the belt is to be applied.

Having fully described my invention, what I claim as new, and desire to secure by Letters Patent, is:—

1. A belt composed of a plurality of links, each link comprising a plurality of link members arranged side by side capable of being varied in number to vary the width of the belt, gripping members carried by the link members and traction member carried by the gripping members and lying in facial abutment with the edges of the link members.

2. A belt composed of a plurality of links consisting of a plurality of link members, and traction blocks carried by said links and lying in facial abutment with the edges of the link members, the outer link members of each link preventing movement of the block across the working face of the link.

3. A belt comprising a plurality of links composed of a plurality of link members, traction blocks lying in facial abutment with the edges of the link members, gripping members carried by the link members and engaging and preventing movement of the traction blocks longitudinally of the belt, the outer link members of each link preventing movement of the block across the working face of the belt.

4. A flexible belt link composed of a plurality of intermediate link members and outer link members, and a traction block confined between the outer link members and held against movement across the working face of the link.

5. A belt link comprising a plurality of intermediate link members, outer link members, a traction block confined between the outer link members and held against movement transversely of the link, and means carried by the intermediate link members preventing movement of said block longitudinally of the link.

6. A belt link comprising a plurality of intermediate link members, a traction block engaging said intermediate link members, means carried by said intermediate link members retaining the block against movement longitudinally of the link but permitting removal of said block transversely of the link, and outer link members arranged at the sides of the intermediate link members confining the block and preventing removal of the latter transversely of the belt link.

7. A belt link comprising a plurality of intermediate link members, a traction block engaged with said link members, undercut projections on said intermediate link members engaging and retaining the block but permitting removal of the latter transversely of the intermediate link members, and outer link members abutting the block and preventing removal of the latter transversely of the belt link.

8. A belt comprising a plurality of the groups of link members, pivot rods connecting the adjacent ends of the groups of link members, said link members being provided with slots, nuts applied to the ends of the rods, and means carried by said nuts engageable in said slots to prevent displacement of the nuts.

In testimony that I claim the foregoing as my invention, I have signed my name in presence of two subscribing witnesses.

SHIGERU MATSUMOTO.

Witnesses:
SHIRO NISHIUCHI,
DAISABURO MOCHIZUKI.